SWIMMING POOL CONSTRUCTION

Original Filed Dec. 5. 1966 3 Sheets-Sheet 1

INVENTOR.
JOHN P. PEREIRA
BY
Salter & Michaelson
ATTORNEYS

SWIMMING POOL CONSTRUCTION

Original Filed Dec. 5, 1966 3 Sheets-Sheet 2

INVENTOR.
JOHN P. PEREIRA
BY
Salter & Michaelson
ATTORNEYS

SWIMMING POOL CONSTRUCTION

Original Filed Dec. 5, 1966 3 Sheets-Sheet 3

INVENTOR.
JOHN P. PEREIRA
BY
Salter & Michaelson
ATTORNEYS

United States Patent Office

Re. 26,977
Reissued Nov. 3, 1970

26,977

SWIMMING POOL CONSTRUCTION

John P. Pereira, Warwick, R.I., assignor to Weatherking Products, Inc., Providence, R.I., a corporation of Rhode Island Original No. 3,416,165, dated Dec. 17, 1968, Ser. No. 599,100, Dec. 5, 1966. Application for reissue Apr. 10, 1969, Ser. No. 824,006
Int. Cl. E04h *3/16*
U.S. Cl. 4—172.19 15 Claims

Matter enclosed in heavy brackets [ ] appears in the original patent but forms no part of this reissue specification; matter printed in italics indicates the additions made by reissue.

ABSTRACT OF THE DISCLOSURE

A swimming pool construction in which all of the component parts thereof are prefabricated and are assembled at the site of installation. A plurality of preformed panel assemblies are interconnected to form a shell and receive a flexible inner liner that defines the interior surface of the pool.

BACKGROUND OF THE INVENTION

Swimming pools have normally been constructed by excavating at the site of the pool and then forming a pool shell by pouring concrete into forms that are prepared in accordance with the selected design. This type of pool is usually preferred, but because of high installation costs, they are available only to a relatively few people. In recent years, so-called inexpensive pools for residential uses were developed that did not require extensive excavation or the pouring of concrete and were essentially prefabricated in that the component parts were preformed and installed at the site of the pool. The heretofore known prefab type of pool has been usually constructed of wood members having a flexible inner liner, the wood components being bolted or nailed together in any accepted manner so as to build up a platform within which the liner was positioned. Although these prior known prefabricated pools generally satisfied the purpose for which they were intended, they were difficult to construct, thereby resulting in a higher installation cost than anticipated and, moreover, requiring continuing maintenance throughout the lifetime of the pool.

SUMMARY OF THE INVENTION

The present invention represents a departure from the prefabricated swimming pool known heretofore and provides a full-sized pool for residential use that not only is simple to install but that is constructed in such a manner as to be inherently resistant to normal wear, thereby eliminating continuing maintenance requirements. A pool of the present invention may be constructed either above the ground or below the ground, the below ground pool requiring additional excavation and thereby being somewhat more costly than the above ground type. In either type of pool, the invention includes a unique shell that is defined by a plurality of panel assemblies that are formed by interconnected metallic panel sections, the panel sections being preferably formed of aluminum. The panel assemblies are interconnected and braced periodically along the length of the walls of the shell in such a manner as to form a rigid shell construction. The inside surface of the shell as defined by the panel assemblies is relatively unobstructed thereby providing for receiving a flexible liner in overlying relation thereon. The liner is retained in position by a unique slot detail formed in the panel assemblies, and an adjustable coping overlies the upper end of the panel assemblies to define a marginal area therefor. The unique bracing of the present invention not only locates the panel assemblies in rigid interconnected relation but further provides for the formation of a platform in the above-ground pool and for receiving ornamental outer panels that define the exterior of the above-ground pool wall.

Accordingly, it is an object of the invention to provide a swimming pool for residential use that is formed by a plurality of metallic panel assemblies that are interconnected to define a shell in which a plastic liner is received.

Another object is to provide a swimming pool wherein the shell thereof is formed by a plurality of metallic panel assemblies that are retained in position by support members, the support members including a base on which the panel assemblies are received and further including bracing means that are designed to retain the panel assemblies in a generally upright position.

Another object is to provide an adjustable coping for use in a swimming pool construction that is mounted on wall sections that are formed by the assembly of a plurality of metallic panel sections.

Other objects, features and advantages of the invention will become apparent as the description thereof proceeds when considered in connection with the accompanying illustrative drawings.

DESCRIPTION OF THE INVENTION

Figure 1:
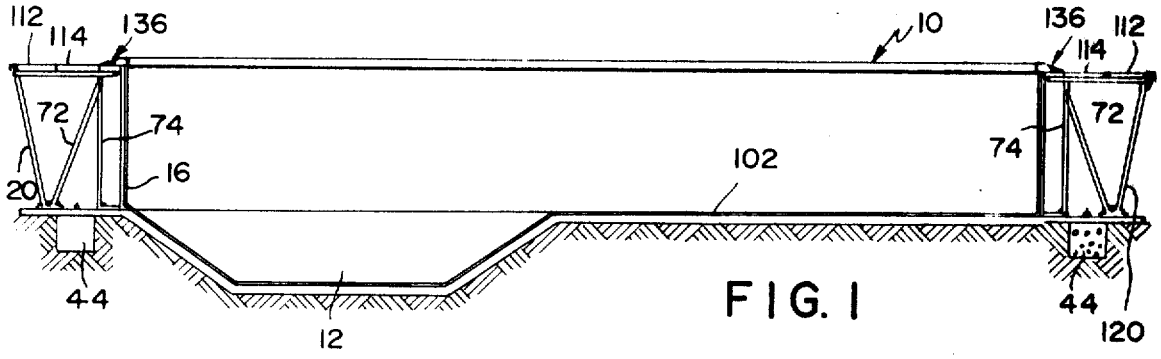
FIG. 1 is a sectional view showing one form of a swimming pool construction embodied in the present invention.

Referring now to the drawings and particularly to FIGS. 1 through 7, one form of a pool construction embodied herein is generally indicated at 10 and is of the above-ground type, wherein the walls of the pool are located above the level of the ground on which the pool is constructed. In this connection, the ground on which the pool is built may be prepared by excavating a portion thereof indicated at 12 which will define the diving end of the pool.

Figure 5:
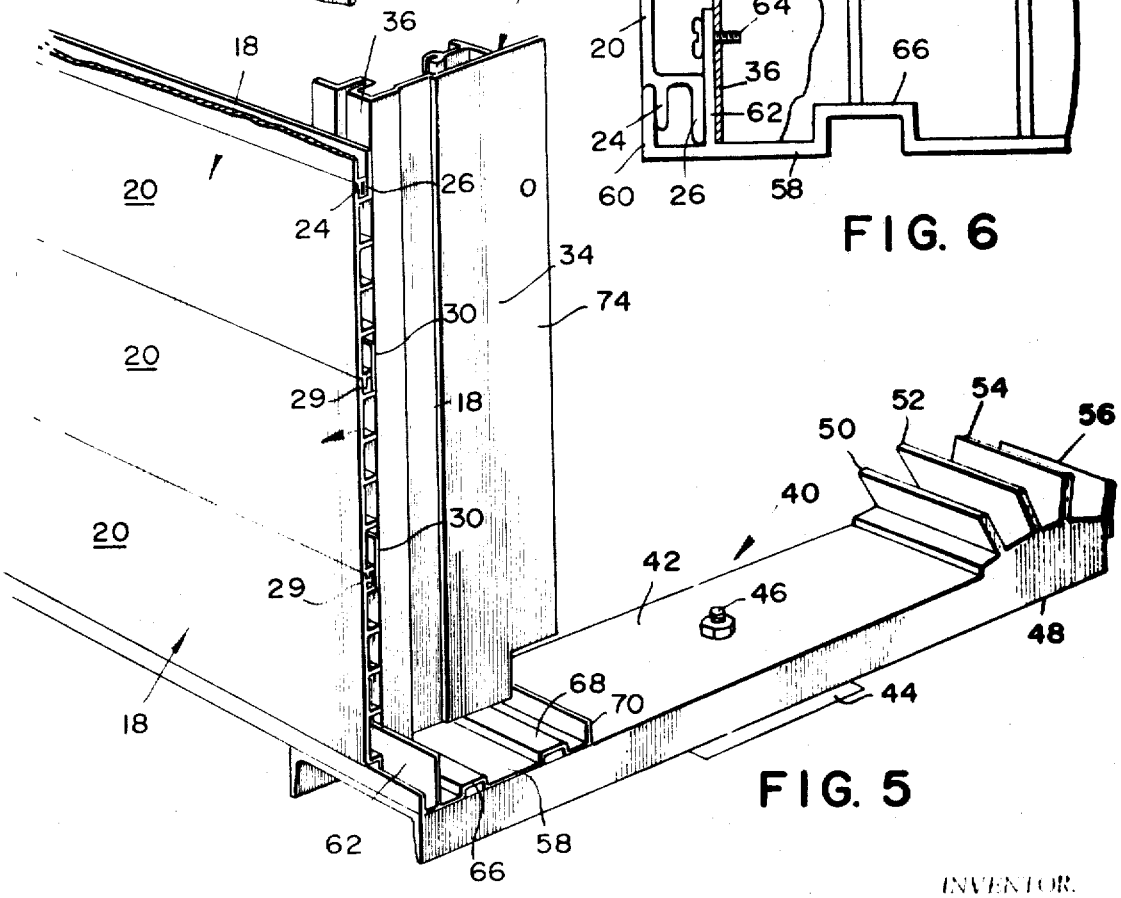
FIG. 5 is a perspective view of a portion of a panel assembly and support therefor of the swimming pool construction shown in FIG. 1.

In constructing the pool 10, a plurality of panel assemblies one of which is generally indicated at 14 in FIG. 5 are interconnected together to define a shell having opposed side walls and end walls. As will be described, the walls that define the shell are adapted to receive in overlying relation thereon a flexible liner 16 that forms the inside surface of the pool, and it is within the liner 16 that water is received.

Figure 6:
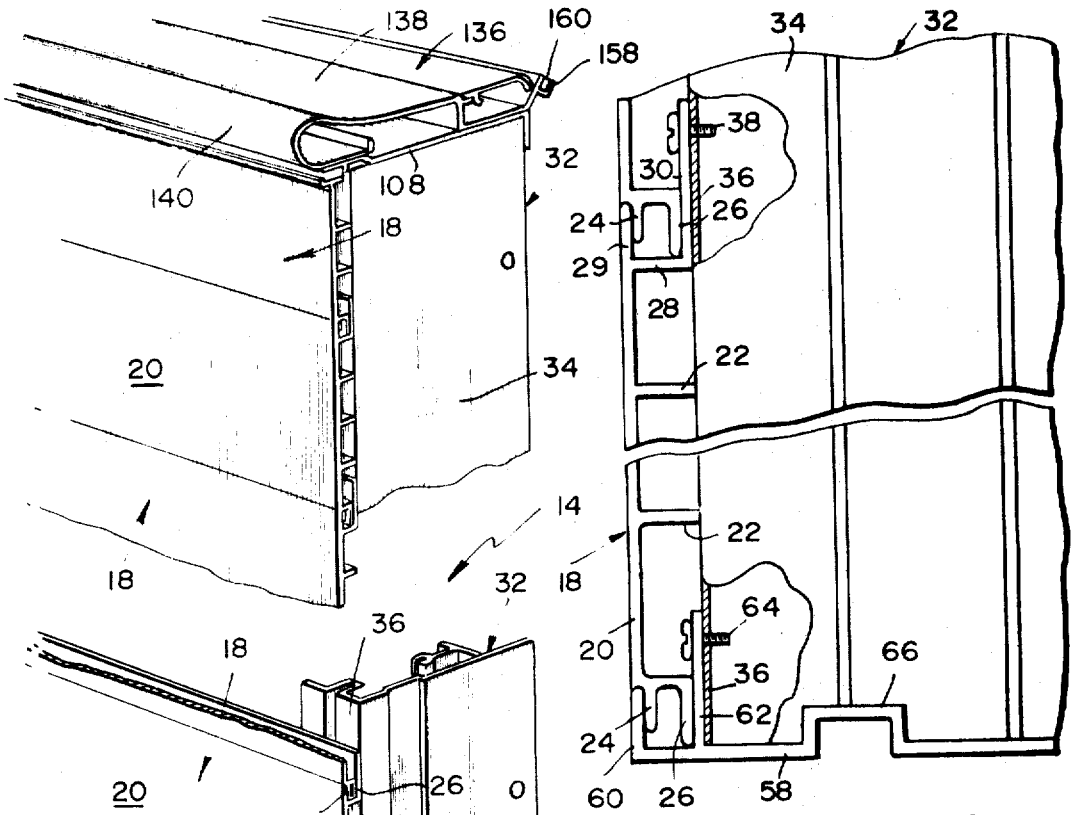
FIG. 6 is an enlarged fragmentary view with portions shown in section of the panel assembly illustrated in FIG. 5.

Each of the panel assemblies 14 is constructed of a plurality of horizontally extending panel sections generally indicated at 18, the panel sections 18 being formed so as to be interfitted together in interlocking engagement for forming a flush inner surface. Referring to FIGS. 2, 3, 5 and 6, a panel section 18 is shown being defined by a vertical wall 20 to which intermediate ribs 22 are integrally joined. As illustrated, the panel sections 18 are formed of a metallic material, preferably aluminum, and are normally extruded in a one-piece unit in the fabrication thereof. Joined to the wall 20 of each panel section 18 at the lowermost end thereof is an offset depending flange 24 from which is spaced a second offset depending flange 26, the flange 26 being somewhat longer than the flange 24 and defining a flange portion therewith. Joined to the uppermost end of the wall 20 is a rib 28 to which an upstanding wall 30 is joined. The wall 30 is spaced from an extension 29 of the wall 20 by the width of the rib 28, this spacing being dimensioned to define a socket that receives the depending flanges 24 and 26 of an adjacent panel 18, as illustrated in FIG. 6.

Figure 2:
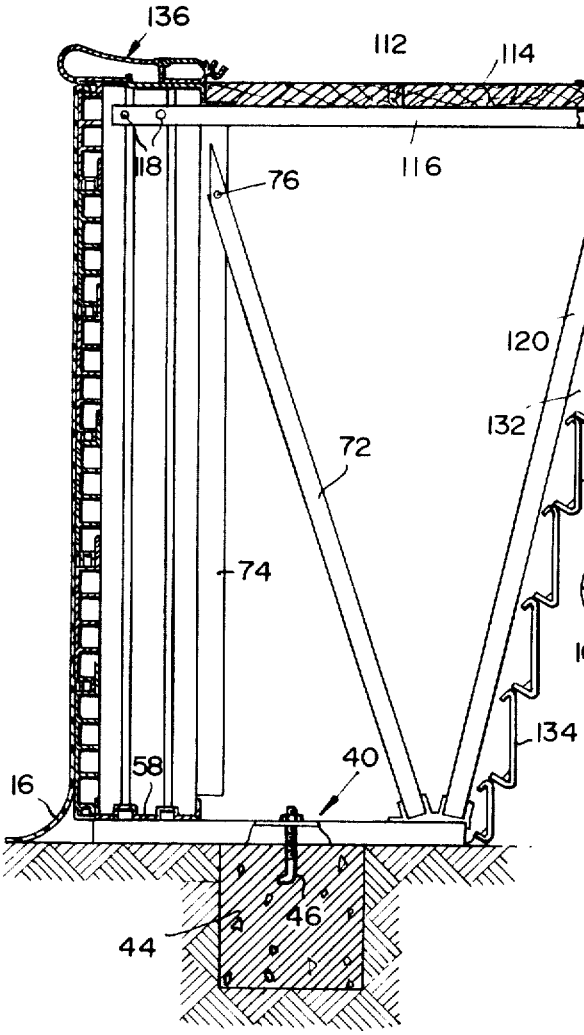
FIG. 2 is an enlarged sectional view of a portion of the swimming pool construction illustrated in FIG. 1.

Referring to FIGS. 2 and 5, it is seen that a panel assembly 14 is fabricated by securing a plurality of the panel sections 18 in edge-to-edge relation with the longitudinal axes of the panels extending in a generally horizontal direction, and as will be described, as the panel sections are assembled in position, each one is bolted to a vertical support member generally indicated at 32 that is formed as a part of the panel assembly 14. The vertical support member 32 defines an end wall of the panel assembly 14 and includes a plate 34 to which a flange portion 36 is integrally joined. As seen in FIG. 6, the flange portion 36 abuts against the ribs 22 and vertical walls 30 of the panel sections 18 and a bolt 38 extends through the vertical wall 30 and is received in the flange portion 36 of the vertical support member 32. It is seen that a bolt 38 is secured to a vertical wall of one panel section 18 prior to locating the next panel section 18 in interlocking relation thereabove. Thus, the panel sections 18 are built up one on top of the other, each panel section 18 being secured to the flange portion 36 by a bolt 38. The panel assembly 14 is thereby supported by the vertical support members 32 at the ends thereof which retain the panel sections 18 in rigid relation as they are bolted in edge-to-edge interlocked position.

The panel assemblies 14 are mounted in a generally up-right vertical position to define the walls of the pool shell, the abutting edges of the panel sections 18 of each panel assembly being closely positioned so as to define a substantially smooth and uninterrupted surface. In order to support the panel sections 14 in the upright position thereof, they are mounted on lower horizontal supporting members one of which is generally indicated at 40 in FIG. 5. Each of the lower supporting members 40 is defined by a channel-shaped base 42 that may be secured to a concrete block 44 located in the ground on which the supporting member 40 rests, an anchoring bolt 46 extending through the base 42 and into the concrete block 44. Fixed to one end of the base 42 is a bracket 48 on which flanges 50, 52, 54 and 56 are formed. Located on the opposite end of the base 42 is a longitudinally extending bottom member 58 that is secured to the lowermost panel section 18 and to the lowermost end of the vertical support member 32, thereby defining the bottom end of the panel assembly 14. As shown in FIG. 6, the bottom member 58 is formed with an end flange 60 from which is spaced an intermediate wall 62, the flange 60 and wall 62 defining a socket in the manner as described hereinabove in connection with the panels 18. The socket defined by the flange 60 and wall 62 receives the offset depending flanges 24 and 26 of the lowermost panel section 18 and a bolt 64 extends through the wall 72 for securement to the flange portion 36 of the vertical support member 32. As further shown in FIGS. 2 and 5, the lower end of the vertical support member 32 engages ribs 66 and 68 that are formed on the bottom member 58, the ribs 66 and 68 acting to reinforce the bottom member 58. An end flange 70 is also formed as part of the bottom member 58 and receives an inturned wall 71 of the support member 32 thereagainst for further locating the vertical support member 32 in position.

As shown in FIGS. 1 and 5, the lower horizontal supporting member 40 is disposed such that the longitudinal axis thereof is located perpendicular to the longitudinal axes of the panel sections 18. The supporting members 40 thus provide a rigid support structure for the panel assemblies 14 as they are mounted in place in end-to-end relation to define the shell walls.

In order to further support the panel assemblies 14 in the generally upright position thereof, a bracing member 72 is provided and is fixed between the flanges 50 and 52 of the bracket 48. The bracing member 72 extends upwardly in inclined relation and is secured to an extension 74 that is formed as an integral part of the wall 34 of the vertical support member 32. As shown in FIG. 2, the extension 74 is formed with a hole 75 through which a bolt 76 extends for locking the uppermost end of the bracing member 72 thereto. The lower end of the bracing member 72 may be secured between the flanges 50 and 52 in any well-known manner, such as by bolts or welding.

Figure 7:
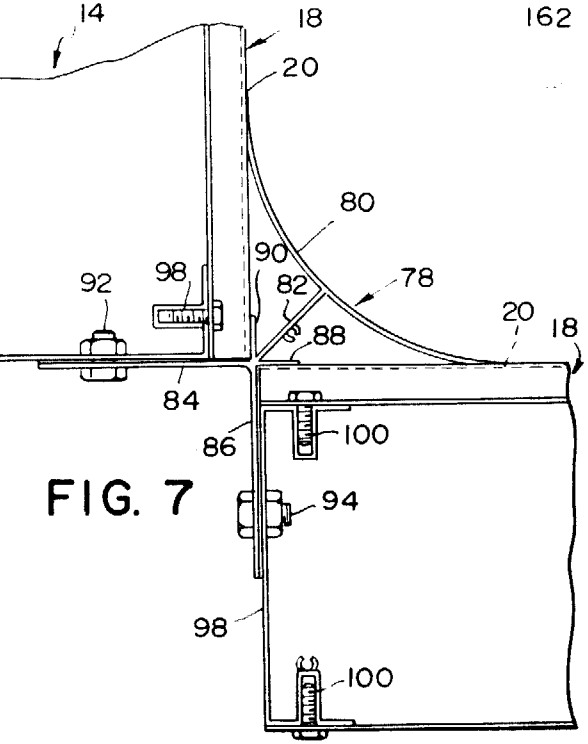
FIG. 7 is a top plan view of the corner detail of the swimming pool construction illustrated in FIG. 1.

Referring now to FIG. 7, a corner detail of the swimming pool construction 10 is illustrated, and, as shown, a pair of panel assemblies 14 are disposed in perpendicular relation, the inner corners thereof being located in closely adjacent relation so as to define a corner of the pool shell. In order to lock the corners of the end panel assemblies together, a corner member generally indicated at 78 is provided and is formed in a one-piece construction. The corner member 78 includes an arcuate-shaped wall 80 that is adapted to span a corner of the shell so as to engage the walls 20 of the adjacent panel assemblies 14. Extending rearwardly from the arcuate-shaped wall 80 is a web 82 to which walls 84 and 86 are joined, the wall 84 having a forward extension 88 and the wall 86 having a forward extension portion 90 connected thereto. It is understood that the corner member 78 is preferably fabricated of a metal material such as aluminum, and is extruded to the shape illustrated. The cover member 78 is fixed in place by locating the extensions 88 and 90 of the walls 84 and 86 in engaging relation with respect to the ends of the walls 20 of the adjacent panel sections 18. The wall 84 of the member 78 is disposed in engaging relation with respect to an end member 96 and the wall 86 is similarly located in engaging relation with respect to an end member 97. As shown in FIG. 7, bolts 92 and 94 are employed for locking the walls 84 and 86 to the end members 96 and 97 respectively. The end members 96 and 97 which are generally U-shaped in configuration are secured in the panel assembly by bolts 98 and 100 respectively. It is seen that the corner members 78 will effectively locate a pair of the panel assemblies 14 at the corners of the shell in interlocked relation and thus cooperate with the support members 40 and the bracing members 72 to form the complete shell construction.

Figure 3:
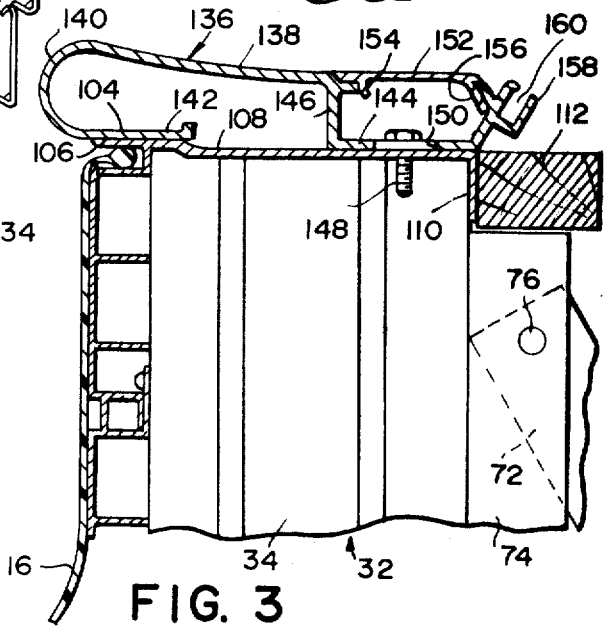
FIG. 3 is a fragmentary enlarged sectional view of a portion of the swimming pool construction illustrated in FIG. 2.

With the panel sections 32 interfitted and locked in place to form the shell of the pool, the plastic liner 16 is fixed in position in overlying relation with respect to the walls as defined by the shell. Prior to fixing the liner 16 in position, the floor or bed of the pool is prepared by laying a sand base, as indicated at 102 in FIG. 1. As further illustrated in FIG. 1 and described hereinabove, a portion of the bed of the pool is preferably excavated to form a deep end 12 as is normally the custom in pool constructions. The liner 16 is formed with an upper beaded edge 104 as indicated in FIG. 3, the beaded edge 104 being received in a longitudinally extending slot 106 that is formed on the uppermost end of the upper panel section 18 of each panel assembly. As more clearly shown in FIG. 3, the upper panel section 18 includes a top wall 108 that extends from the slot 106 rearwardly therefrom and is formed as an integral part of the panel section 18 to which it is joined. A rear depending flange 110 is joined to the wall 108 and abuts against the wall 71 of the support member 34, thereby cooperating with the flange 70 for locating the support member 32 in place. Since the liner 16 is formed of a plastic material, the beaded edge 104 may be squeezed into the slot 110 and is fixed therein, the remaining portion of the liner falling downwardly from the beaded edge in overlying relation with respect to the walls 20 of the panel sections 18. It is understood that since the slot 110 as formed in the uppermost panel section 18 of the panel assemblies 32 extends entirely around the shell, liner 16 will completely cover the shell and thus defines the enclosure that receives the water therein.

Figure 4:
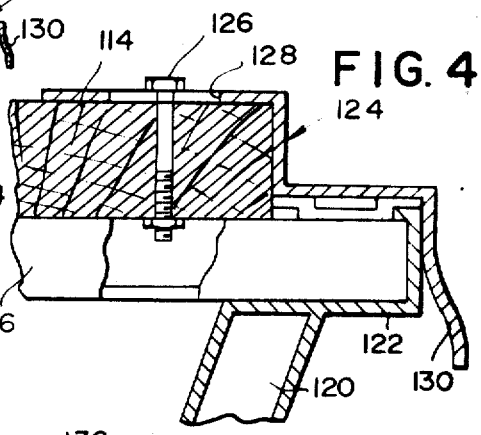
FIG. 4 is a fragmentary sectional view of another portion of the swimming pool construction illustrated in FIG. 2.

In the form of the invention illustrated in FIGS. 1 through 7, the shell of the pool is located above ground level, and since easy access to the interior of the pool is required, a platform is provided that extends around the perimeter of the pool walls. Referring now to FIGS. 2 and 4, platform members 112 and 114 are shown supported at the uppermost end of the panel assemblies 14 and are defined by wooden planks that are cut to required lengths for extending over spaced upper horizontal support members 116. Each of the horizontal support members 116 is secured to a wall 34 of a vertical support member 32 at the upper end thereof by bolts 118 and extend a sufficient distance to receive the platforms 112 and 114 thereon. As seen in FIG. 3, the platform member 112 abuts against the depending flange 110 formed as part of an uppermost panel section 32 while the platform member 114 extends substantially to the outermost end of the upper horizontal support member 116. In order to more firmly support the platform members 112 and 114, an additional bracing member 120 is provided, and, as illustrated in FIG. 2, is received at the lower end thereof between the flanges 54 and 56 of the support member 40. The upper end of the bracing member 120 is formed with an extension 122 that receives the outermost end of the platform member 116 therein. An adjustable platform receiver 124 is fixed to the platform member 114 by a bolt 126 that extends through a slot 128 formed in an upper wall of the platform receiver 124 and that also extends through the platform member 114 for securement within the support member 116. The adjustable platform receiver 124 includes a depending portion 130 that projects below the edge of the bracket 122 and defines an ornamental facing therefor. It is seen that the platform receiver 124 may be conveniently shifted with respect to the platform member 114 so as to compensate for the width of the platform.

As further illustrated in FIG. 2, each of the bracing members 120 is formed with a stringer generally indicated at 132 in which a plurality of vertically spaced notches are formed. Ornamental plates 134 having inturned edges are secured in the notches formed in the stringer 132 and are located in adjacent overlapping relation to define an ornamental outer surface for the above-ground pool. It will be observed that the stringer 132 is inclined generally inwardly toward the pool shell, the ornamental plates 130 being also inclined in this direction but overlapping each other to essentially conceal the notch detail of the stringers.

The peripheral edge of the pool is finished off by a coping generally indicated at 136 which is illustrated in FIG. 3, includes a tubular-like extrusion 138, the outer surface of which is rounded at 140 so as to overhang the edge of the pool, thereby forming an ornamental edging therefor. The rounded end 140 also eliminates sharp corners at the pool edge as is the accepted practice in pool constructions. The coping 136 also includes a lower wall 142 that engages the wall 108 of the upper panel section 18, and a rearwardly extending section 144 that is joined to the upper wall 138 through a depending section 146. A bolt 148 extends through a slot 150 formed in the section 144 for securing the coping 136 to the upper wall 108. It is seen that the coping may be adjustably positioned relative to the wall of the pool by loosening the bolt 148 and sliding the coping 136 within the limits of the slot 150. A snap-in cover piece 152 engages the coping 136 at the rear portion thereof and encloses the bolt 148.

The snap-in cover piece 152 includes spaced fingers 154 and 156 that provide for the snapping in of the section 152 between suitably positioned flanges on the coping. The coping 136 may also be formed with a rearwardly extending projection 158 in which a slot 160 is formed. The slot 160 is adapted to receive the bead of a cover receiver (not shown) when it is desired to cover the surface of the pool.

Figure 8:
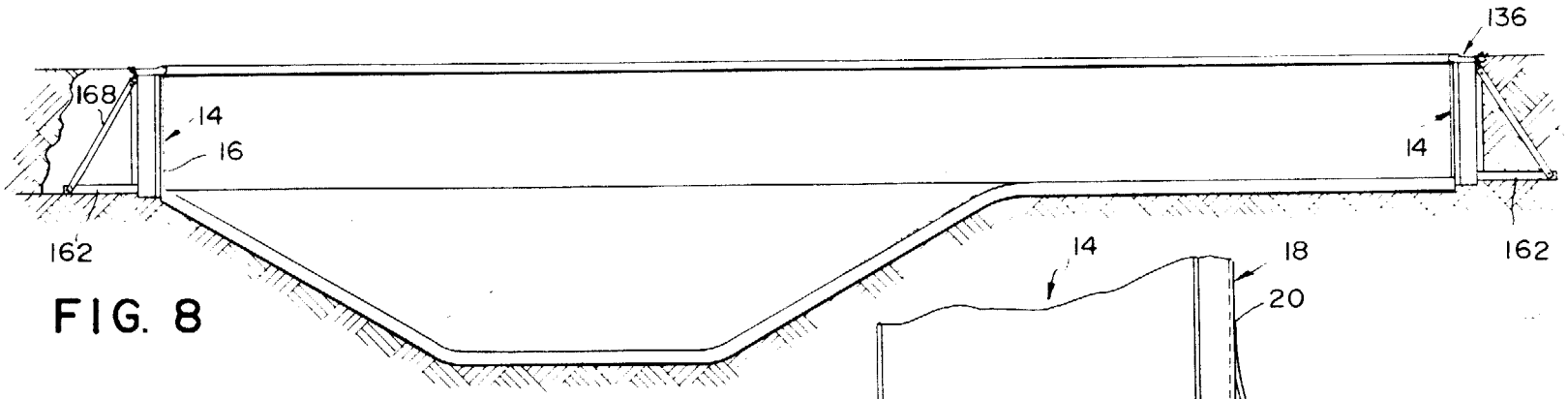
FIG. 8 is a sectional view showing a modified form of the invention.
Figure 9:
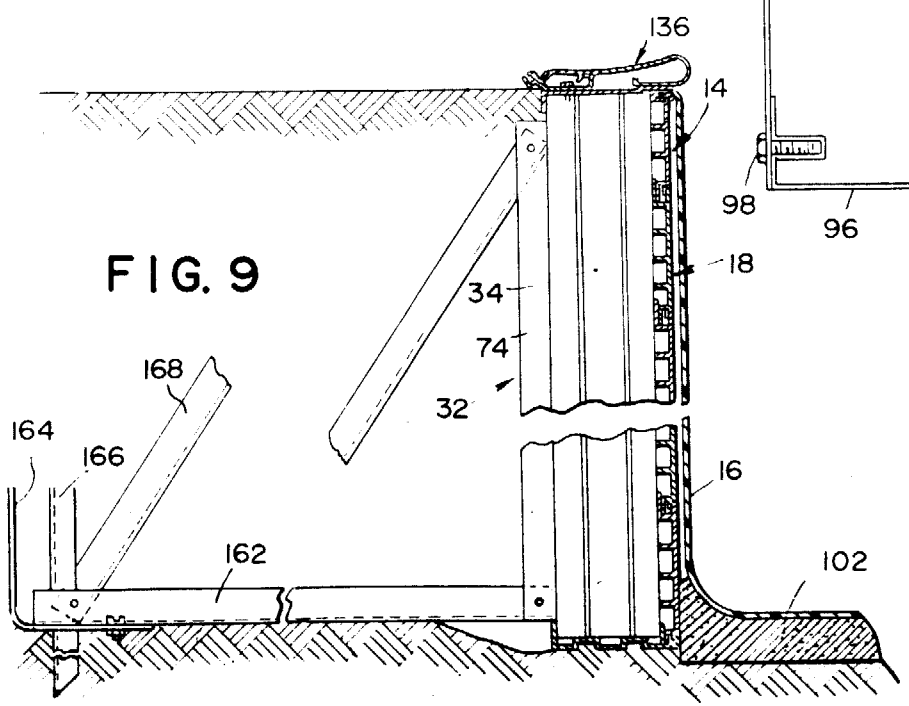
FIG. 9 is a sectional view showing a modified support structure employed in the embodiment of the invention illustrated in FIG. 8.

Referring now to FIGS. 8 and 9, a modified form of the invention is illustrated and differs from the construction illustrated and described above in that the shell of the pool is located below the ground level. The construction of the panel assemblies 14 that define the pool shell in the above-described pool is substantially the same in the form of the pool illustrated in FIGS. 8 and 9. The essential difference in the two constructions is in the bracing or support of the panel assemblies, and in this connection reference is now made to FIG. 9. In order to support the panel assemblies 14 in position, a plurality of horizontal lower support members 162 are secured to the lower end of the extension 74 of the vertical support member 32. The support members 162 are located in engagement with the ground that has been excavated around the pool area, and a bracket 164 is joined thereto at the outermost end thereof. A stake 166 extends through the bracket 164 for firmly mounting the support member 162 in position. An inclined bracing member 168 is fixed to the outer end of the support member 162 and extends upwardly in an inclined direction for engagement with the extension 74 of the support member 32. The panel assemblies are thus fixedly braced in a generally upright position. After securement of the bracing members 168 in the manner as illustrated, and the location of the panel sections 32 to define the shell of the pool in the manner as illustrated, the area therearound is filled in so as to provide an inground type of pool, wherein the coping 136 is located substantially at ground level. The liner 16 is fixed to the panel sections in the manner as previously described after a sand base such as indicated at 102 is properly prepared for placement of the liner 16 thereon. The coping 136 is also fixed to the uppermost end of the panel sections in the manner as previously described, and it is understood that platform member is not required in the form of the invention as illustrated in FIGS. 8 and 9. In this connection, the ground surrounding the coping 136 may be formed with a concrete, stone or tiling area to form an access to the pool. It is further understood that the panel assemblies 32 in the form of the invention as illustrated in FIGS. 8 and 9 are secured to the corners thereof by a corner member 78 as illustrated in FIG. 7 and described hereinabove.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. In a swimming pool, a plurality of *vertically disposed* panel assemblies that are interconnected to form a shell that has opposed vertically disposed end walls and side walls, each of said panel assemblies including a plurality of panel sections, *the longitudinal axes of which are horizontal, said panel sections being* [that are] interconnected to form a portion of a wall, a plurality of vertical support members located adjacent to said panel assemblies *in spaced relation with respect to each other* exteriorly of said shell and receiving said panel sections in interlocked relation thereon, each of said panel sections that is located intermediate the top and bottom of a panel assembly being formed with a socket that is located along a longitudinal edge of the panel section, one wall of said socket being secured to a vertical support member, the other longitudinal edge of each intermediate panel section having a flange portion that is received in a socket of an adjacent panel section, wherein the adjacent panel sections are interlocked together on a support member, and a flexible liner located interiorly of said shell and being secured to the upper ends of said panel assemblies to form the inside surface of said pool.

2. In a swimming pool as set forth in claim 1, a plurality of lower support members located in spaced-apart relation exteriorly of said shell, means for securing said lower support members in fixed position, and bracing means interconnected to said lower support members and said panel assemblies for supporting said panel assemblies in a substantially upright position so as to form the walls of said shell.

3. In a swimming pool as set forth in claim 1, the uppermost of said panel sections having a longitudinally extending groove formed therein, said liner having an upper beaded edge that is received in the grooves of said uppermost panels for locating said liner in overlying relation with respect to the walls of said shell.

4. In a swimming pool as set forth in claim 3, a coping member located on each of said panel assemblies and mounted on the uppermost of the panel section and in overlying protective relation with respect to the upper end of said liner, and means for adjusting said coping members in a direction that is transverse to the longitudinal axes of said panel sections.

5. In a swimming pool as set forth in claim 2, a corner member joined to the panel assemblies that define the ends of said walls so as to interconnect the walls of said shell, said corner members including an arcuate wall that overlies the corners of said shell and defines a surface for receiving said liner at the shell corners.

6. In a swimming pool as set forth in claim 2, each of said lower support members including a base member on which a panel assembly is supported, each of said panel assemblies including a vertical plate, and said bracing means being interconnected to said base member and to said vertical plate for supporting the panel assembly with which it is associated in the upright position thereof.

7. In a swimming pool as set forth in claim 2, each of said lower support members including a base member, the longitudinal axis of which is perpendicular to the longitudinal axes of said panel sections, a plurality of spaced flanges formed on said base member, each of said vertical support members including a vertical plate, and said bracing means being interconnected between a pair of said flanges on a base member and to said vertical plate for supporting the panel assemblies in the upright position thereof.

8. In a swimming pool as set forth in claim 6, said shell being located below the level of ground, wherein said support assemblies are embedded in said ground, and a coping mounted on the uppermost panel section of said panel assemblies and defining a marginal access area for said shell.

9. In a swimming pool as set forth in claim 6, said shell being located above ground so that at least a portion of said liner overlies the surface of said ground and the panel sections project upwardly with respect thereto to position the uppermost panel of each panel section in vertically spaced relation above the surface of said ground, an upper support member interconnected to said vertical plate, and an outer brace member that is interconnected to said lower support member and to said upper support member, a platform supported by said upper support members, and a coping mounted on the uppermost panel section of said panel assemblies and cooperating with said platform to form a marginal area for said shell.

10. In a swimming pool as set forth in claim 6, a platform receiver being mounted on the outer peripheral edge of said platform and being secured to the outer edges of said upper support members, and means for adjusting the position of said platform receiver in a direction that is parallel to the longitudinal axes of said upper support members, a corner member joining each side wall to an end wall, and means interlocking said corner members to the panel assemblies that define adjacent side and end walls.

11. In a swimming pool as set forth in claim 10, *said bracing means including a plurality of spaced outer brace members,* said outer brace members being inclined in a direction toward the shell, and a stringer secured to each of said outer brace members and having a plurality of notches formed therein along the length thereof, and a plurality of ornamental plates received on said notches so as to be disposed in overlapping edge-to-edge relation and thereby forming an ornamental outer wall section for said pool.

*12. In a swimming pool, a plurality of vertically disposed panel assemblies that are interconnected to form a shell that has opposed vertically disposed end walls and side walls, each of said panel assemblies including a plurality of panel sections, the longitudinal axes of which are horizontal, said panel sections being interconnected to form a portion of a wall, a plurality of vertical support members located adjacent to said panel assemblies in spaced relation with respect to each other exteriorly of said shell and receiving said panel sections in interlocked relation thereon, each of said panel sections that is located intermediate the top and bottom of a panel assembly being formed with a socket that is located along a longitudinal edge of the panel section, a portion of each panel section being secured to a vertical support member, the other longitudinal edge of each intermediate panel section having a flange portion that is received in a socket of an adjacent panel section, wherein the adjacent panel sections are interlocked together on a support member, and a flexible liner located interiorly of said shell and being secured to the upper ends of said panel assemblies to form the inside surface of said pool.*

*13. In a swimming pool as set forth in claim 12, a corner member joined to the panel assemblies that define the ends of said walls so as to interconnect the walls of said shell, said corner member including an arcuate wall that overlies the corners of said shell and defines a surface for receiving said liner at the shell corners.*

*14. In a swimming pool as set forth in claim 12, a plurality of lower support members located in spaced-apart relation exteriorly of said shell, means for securing said lower support members in fixed position, and bracing means interconnected to said lower support members and said panel assemblies for supporting said panel assemblies in a substantially upright position so as to form the walls of said shell.*

*15. In a swimming pool as set forth in claim 12, the uppermost of the panel sections having a longitudinally extending groove formed therein, said liner having an upper beaded edge that is received in the grooves of said uppermost panel sections for locating said liner in overlying relation with respect to the walls of said shell.*

References Cited

The following references, cited by the Examiner, are of record in the patented file of this patent or the original patent.

UNITED STATES PATENTS

| | | | |
|---|---|---|---|
| 367,759 | 8/1887 | Little | 52—539 XR |
| 1,631,051 | 5/1927 | Nichols | 220—5 |
| 1,693,695 | 12/1928 | Ellis | 220—5 |
| 2,183,620 | 12/1939 | Myers | 52—539 XR |
| 2,478,993 | 8/1949 | Wing | 52—588 XR |
| 2,869,140 | 1/1959 | Wiedemann | 4—172.19 XR |
| 3,085,367 | 4/1963 | Ridder et al. | 52—588 XR |
| 3,167,204 | 1/1965 | Rouse | 220—5 |
| 3,256,532 | 6/1966 | Lindsey et al. | 4—172.19 |

(Other references on following page)

UNITED STATES PATENTS

| | | | |
|---|---|---|---|
| 3,317,927 | 10/1967 | Shields | 4—172.19 |
| 3,347,006 | 10/1967 | Fox | 4—172.21 XR |
| 3,351,958 | 11/1967 | Shields | 4—172.21 |
| 3,409,916 | 11/1968 | Billig et al. | 4—172.19 |
| 2,490,272 | 12/1949 | Kascle | 4—172 |
| 3,142,069 | 7/1964 | O'Connell et al. | 4—172 |
| 3,274,621 | 9/1966 | Diemond et al. | 4—172 |
| 3,276,043 | 10/1966 | Delia | 4—172 |

FOREIGN PATENTS 1,245,055 9/1960 France.

LAVERNE D. GEIGER, Primary Examiner

H. K. ARTIS, Assistant Examiner

U.S. Cl. X.R.

52—152, 169, 588; 220—5